US011930250B2

(12) United States Patent
Cook et al.

(10) Patent No.: US 11,930,250 B2
(45) Date of Patent: *Mar. 12, 2024

(54) VIDEO ASSETS HAVING ASSOCIATED GRAPHICAL DESCRIPTOR DATA

(71) Applicant: Comcast Cable Communications, LLC, Philadelphia, PA (US)

(72) Inventors: Michael Cook, Flemington, NJ (US); Walt Michel, Upper Gwynedd, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,442

(22) Filed: Feb. 22, 2023

(65) Prior Publication Data

US 2023/0308728 A1 Sep. 28, 2023

Related U.S. Application Data

(63) Continuation of application No. 17/354,015, filed on Jun. 22, 2021, now Pat. No. 11,627,381, which is a
(Continued)

(51) Int. Cl.
| | |
|---|---|
| *H04N 21/6405* | (2011.01) |
| *H04N 21/41* | (2011.01) |
| *H04N 21/431* | (2011.01) |
| *H04N 21/462* | (2011.01) |
| *H04N 21/472* | (2011.01) |

(Continued)

(52) U.S. Cl.
CPC ..... *H04N 21/6405* (2013.01); *H04N 21/4126* (2013.01); *H04N 21/41265* (2020.08); *H04N 21/4312* (2013.01); *H04N 21/4622* (2013.01);
*H04N 21/47217* (2013.01); *H04N 21/4722* (2013.01); *H04N 21/8146* (2013.01); *H04N 21/84* (2013.01); *H04N 21/47202* (2013.01)

(58) Field of Classification Search
CPC ........... H04N 21/6405; H04N 21/4126; H04N 21/41265; H04N 21/4312; H04N 21/4622; H04N 21/47217; H04N 21/4722; H04N 21/8146; H04N 21/84; H04N 21/47202
See application file for complete search history.

(56) References Cited

U.S. PATENT DOCUMENTS

| | | | |
|---|---|---|---|
| 6,097,441 | A | 8/2000 | Allport |
| 6,236,395 | B1 | 5/2001 | Sezan et al. |

(Continued)

OTHER PUBLICATIONS

European Search Report, EP 11 18 2989, completion date Jan. 26, 2012.

(Continued)

*Primary Examiner* — Oschta I Montoya
(74) *Attorney, Agent, or Firm* — Banner & Witcoff, Ltd.

(57) ABSTRACT

Graphical descriptor data associated with a particular video asset may include data for one or more graphical descriptor images and graphical descriptor metadata related to each graphical descriptor image. The graphical descriptor images can be simultaneously presented on a display screen with the video asset content and used to navigate to different content in that video asset. The graphical descriptors can also be used to navigate to content of one or more different assets.

30 Claims, 8 Drawing Sheets

Related U.S. Application Data continuation of application No. 15/629,346, filed on Jun. 21, 2017, now Pat. No. 11,082,749, which is a continuation of application No. 12/902,210, filed on Oct. 12, 2010, now abandoned.

(51) Int. Cl.
*H04N 21/4722* (2011.01)
*H04N 21/81* (2011.01)
*H04N 21/84* (2011.01)

(56) References Cited

U.S. PATENT DOCUMENTS

| | | | |
|---|---|---|---|
| 6,711,741 B2 | 3/2004 | Yeo | |
| 6,988,244 B1* | 1/2006 | Honda | H04N 21/8153 725/38 |
| 7,031,596 B2 | 4/2006 | Sai et al. | |
| 7,525,965 B1 | 4/2009 | St. Pierre et al. | |
| 8,301,648 B2* | 10/2012 | Poniatowski | G06F 16/7867 725/38 |
| 8,566,879 B2 | 10/2013 | Nishikawa et al. | |
| 8,914,826 B2 | 12/2014 | Ruiz-Velasco et al. | |
| 10,701,434 B1* | 6/2020 | Jindal | H04N 21/23418 |
| 2002/0035726 A1 | 3/2002 | Corl | |
| 2002/0075572 A1 | 6/2002 | Boreczky et al. | |
| 2004/0098753 A1 | 5/2004 | Reynolds et al. | |
| 2005/0114885 A1 | 5/2005 | Shikata et al. | |
| 2005/0210145 A1 | 9/2005 | Kim et al. | |
| 2006/0200842 A1 | 9/2006 | Chapman et al. | |
| 2007/0100904 A1 | 5/2007 | Casey et al. | |
| 2007/0107026 A1 | 5/2007 | Sherer et al. | |
| 2008/0104646 A1 | 5/2008 | Kanda | |
| 2009/0083787 A1* | 3/2009 | Morris | H04N 21/235 725/32 |
| 2009/0205006 A1 | 8/2009 | Lopez-Estrada | |
| 2009/0269027 A1 | 10/2009 | Bedingfield, Sr. et al. | |
| 2009/0320073 A1 | 12/2009 | Reisman | |
| 2009/0327894 A1 | 12/2009 | Rakib et al. | |
| 2010/0071005 A1 | 3/2010 | Kusunoki | |
| 2010/0245680 A1 | 9/2010 | Tsukada et al. | |
| 2014/0096174 A1* | 4/2014 | Sadja | H04N 21/6175 725/110 |

OTHER PUBLICATIONS

Open Cable Specifications, Enhanced TV Application Messaging Protocol 1.0, OC-SP-ETV-AM1.0-105-091125, dated Nov. 25, 2009, 30 pages.

OpenCable Specifications, Enhanced TV Binary Interchange Format 1.0, OC-SP-ETV-BIF1.0105-091125, dated Nov. 25, 2009, 423 pages.

ETSI TS 102 823 V1.1.1, Technical Specification, Digital Video Broadcasting (DVB); Specification for the Carriage of Synchronized Auxiliary Data in DVB Transport Streams, European Broadcasting Union Union Européenne de Radio- Télévision EBU, Nov. 2005, 37 pages.

Web page from http://hd.engadget.com (prior to Oct. 12, 2010), 3 pages.

Screen shot from "youtube" web page (prior to Oct. 12, 2010), 1 page.

European Office Action—EP App. 11182989.1—dated Mar. 17, 2015.

Response to European Office Action—EP 11182989.1—dated Sep. 25, 2015.

European Office Action—App No. 11182989.1—dated Apr. 11, 2017.

Jul. 17, 2017—Canadian Office Action—CA 2,753,044.
Dec. 1, 2017—European Office Action—EP 11182989.1.
Jun. 26, 2018—Canadian Office Action—CA 2,753,044.
May 30, 2019—Canadian Office Action—CA 2,753,044.
May 25, 2020—Canadian Office Action—CA 2,753,044.
Mar. 11, 2021—Canadian Office Action—CA 2,753,044.
Sep. 23, 2022—CA Office Action—CA App. No. 2,753,044.

\* cited by examiner

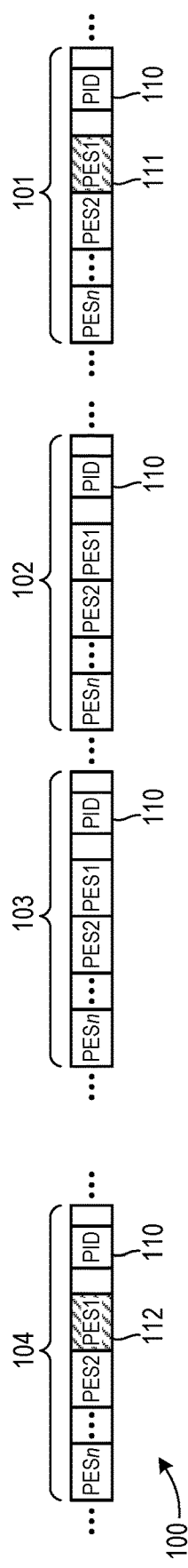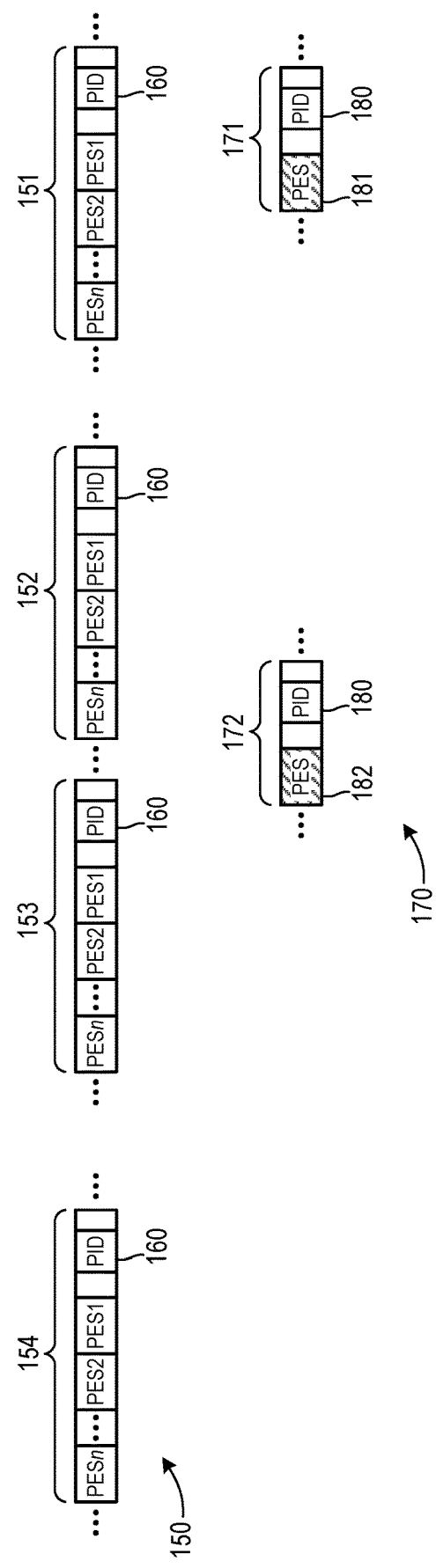
FIG. 5A
FIG. 5B

VIDEO ASSETS HAVING ASSOCIATED GRAPHICAL DESCRIPTOR DATA

CROSS REFERENCE TO RELATED APPLICATIONS

This application is a continuation of and claims priority to U.S. patent application Ser. No. 17/354,015, filed Jun. 22, 2021, which is a continuation of U.S. patent application Ser. No. 15/629,346, filed on Jun. 21, 2017 (now U.S. Pat. No. 11,082,749), which is a continuation of U.S. patent application Ser. No. 12/902,210, filed on Oct. 12, 2010. The above-referenced applications are hereby incorporated by reference in their entirety.

BACKGROUND

The scope of television programs, movies and other video assets available for consumption continues to expand. This expansion includes growth in the number and types of assets available, as well as growth in the number of ways a specific asset might be available. For example, a particular asset available from a data stream that is simultaneously transmitted to multiple destinations might also be available in the form of a unicast stream from a video on demand (VOD) server. With continued expansion of video asset availability, there remains a need for improved devices and techniques for navigating among available assets.

SUMMARY

This Summary is provided to introduce a selection of concepts in a simplified form that are further described below in the Detailed Description. This Summary is not intended to identify key features or essential features of the invention.

In at least some embodiments graphical descriptor data associated with a particular video asset includes data for one or more graphical descriptor images. The video asset might be, e.g., a movie, a sporting event, a television show or another type of programming transmitted on a multicast basis. The graphical descriptor images can be, e.g., screen images, poster art or other types of images. The graphical descriptor data may also include graphical descriptor metadata related to each graphical descriptor image. The graphical descriptor images can be simultaneously presented on a display screen with the video asset content and used to navigate to different portions of content in that video asset based on the contents of the graphical descriptor metadata. The graphical descriptors can also be used to navigate to content of one or more different assets. In some embodiments, content data for a video asset and associated graphical descriptor data received at a destination device may also be transferred to a transferee device. The transferee device may then simultaneously present the content from the transferred data and the associated graphical descriptor images. A user of the transferee device may then select one of the graphical descriptor images to navigate to content in a different portion of the asset or to content of a different asset based on associated graphical descriptor metadata.

BRIEF DESCRIPTION OF THE DRAWINGS

FIGS. 5A and 5B are diagrams showing examples of data streams according to some embodiments.

DETAILED DESCRIPTION

Figure 1:
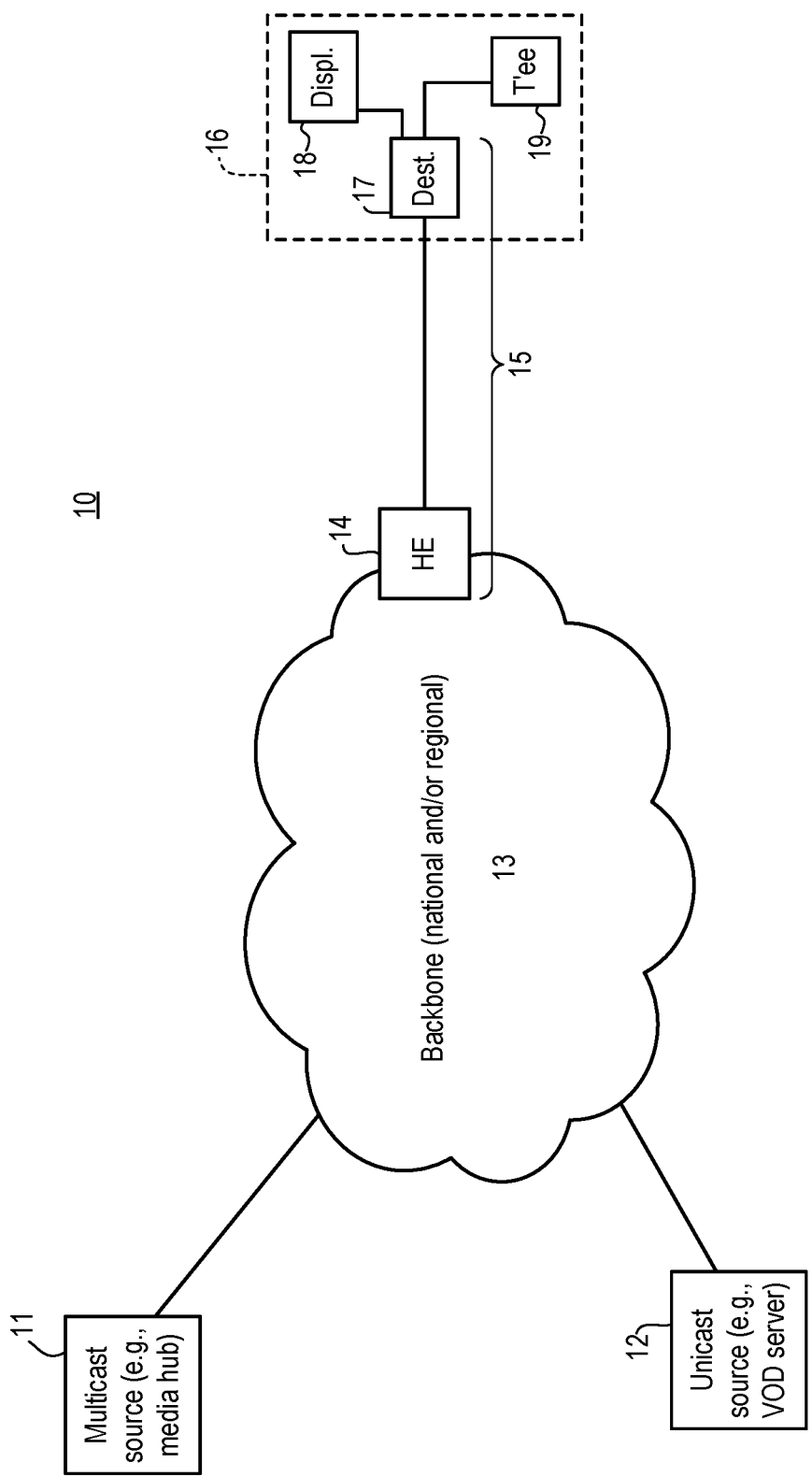
FIG. 1 is a block diagram showing elements in a network according to some embodiments.

"Video content" generally refers to information displayed (or displayable) to a user in the form of one or more images. Video content may have associated audio content, i.e., information presented (or presentable) to a user in audio form. Video content can be communicated or stored in the form of data. Video content data providing a digital representation of a particular video content can be created using any of various encoding techniques. Such techniques include, but are not limited to, compression according to a Moving Picture Experts Group (MPEG) standard (e.g., MPEG-2), compression according to the ITU-T H.264 (ISO/IEC MPEG-4) advanced video coding (AVC) standard, etc. Video content data may be included in a single data stream that also includes associated audio content, or associated audio content data may be carried in a separate stream.

A video content data stream can be transmitted over a network by modulating some type of signal (e.g., an optical signal, an RF carrier signal, an electrical signal carried over a twisted pair) that is communicated over some type of medium (e.g., optical fiber, coaxial cable, twisted pair conductor, free space, etc.) using one or more of various types of communication protocols (e.g., internet protocol). The received signal may then be processed to extract the video content data stream. In addition to demodulating the received signal, such extraction may include demultiplexing by isolating a signal carried on a particular optical wavelength or RF frequency from signals on other wavelengths or frequencies, by isolating certain data segments from other data segments, and/or by other types of demultiplexing techniques. Once the data stream has been extracted, data from that stream can then be decoded and used to generate appropriate electrical signals. Those electrical signals can then be output to a display device (e.g., a television) so as to cause the display device to present the video content on a display screen. Video content data can also be stored in some type of storage device (e.g., a magnetic disk drive) and then later retrieved for decoding and presentation in a similar manner.

A collection of video content (e.g., a series of image frames) may be treated as a unit, or a "video asset," for some purposes. In some cases, for example, a video asset may refer to a collection of video content that a user would normally perceive as a single item of content. Examples of such video assets include a movie, an episode of a television series, coverage of a particular sporting event, a news program, coverage of a concert or other event, etc. A video asset may also include associated audio content (e.g., a soundtrack) and other associated information (e.g., graphical descriptors as discussed below). A "video asset data stream" may be, for example, a series (or other group) of protocol data units (PDUs) that contain (or that are identified as possibly containing) video content data for a particular asset. The PDUs of a video asset data stream may also contain other data associated with the video asset (e.g., audio content data, text for closed captioning, etc.), or such other data could be carried in separate streams. PDUs of a video asset data stream may be time-multiplexed with PDUs of other data streams for transmission. Those other data streams could contain data for associated audio content, other associated data, data for other video assets, or other kinds of data. Examples of video asset data streams are discussed below in connection with FIGS. 5A and 5B. A video asset data stream might be periodically interrupted for reasons unrelated to multiplexing. For example, a stream containing content data for a particular asset might be periodically interrupted and replaced, in whole or in part, with a stream containing content data for a different asset (e.g., a commercial).

In some embodiments, a "graphical descriptor" is an image usable to describe a video asset or a portion of a video asset. "Graphical descriptor image data" refers to data that represents a graphical descriptor image for purposes of communication or storage, and can be created using any of various encoding techniques. Examples of such techniques include, but are not limited to, encoding and compression according one or more Joint Photographic Expert Group (JPEG) standards, creation of a raw bitmap, etc. A graphical descriptor may also have related graphical descriptor metadata. Such metadata can include additional information used to process a graphical descriptor image or a user selection of such an image. Such metadata may also include text that can be presented in conjunction with a graphical descriptor on a display screen, as well as code (or other data) that can cause various actions if a graphical descriptor is selected or otherwise acted upon. Graphical descriptor image data and the related graphical descriptor metadata for a particular graphical descriptor can be collectively referred to as "graphical descriptor data." A graphical descriptor "associated" with a video asset may describe that same video asset or a portion thereof, or it may describe a different video asset (or portion thereof).

For convenience, certain embodiments are initially described by example of a network that delivers video content to a Set Top Terminal (STT) destination device in a hybrid fiber coaxial (HFC) access sub-network, with data for that video content communicated in one or more MPEG-2 transport streams. This initial example is not a limitation. Other embodiments include systems and methods in which content is delivered to other types of destination devices (e.g., a display device, a smart phone, or a general purpose computer). Similarly, additional embodiments include systems and methods that employ other types of communication media (e.g., a fiber to the home (FTTH) passive optical network (PON)), satellite, wireless, and/or other communication protocols (e.g., Internet Protocol (IP)).

FIG. 1 is a block diagram showing certain elements of a communication network 10 according to some embodiments. A first media source 11 outputs multicast video asset data streams. In particular, the data streams output by source 11 contain data for video assets that are intended for simultaneous delivery to numerous destination devices throughout network 10. The data streams from source 11 may be forwarded directly to destination devices, or may be aggregated with video asset data streams from other sources before ultimate delivery to destination devices. In addition, intermediate network elements may receive video asset data streams emanating from source 11 and reformat those streams according to a different communication protocol. Media source 11 may be a media server, a collection of media servers, a network media hub that receives feeds from other sources (e.g., satellite downlinks) and creates video asset data streams, or some other network element or collection of elements. Although not shown in FIG. 1, source 11 includes processing devices, memory, and communication devices (e.g., network interface hardware) for carrying out operations of source 11 described herein.

Also shown in FIG. 1 is a second media source 12 that outputs unicast video asset data streams. In other words, each of the data streams output by source 12 contains data for a video asset that is typically intended for delivery to a single destination device. Source 12 may be, e.g., an enhanced video on demand (VOD) server, or collection of servers, that provide(s) various of types of video asset data as described herein. Source 12 could include, e.g., Internet video servers, servers outputting content from provider vaults, etc. Source 12 may include processing devices, memories, and communication devices (e.g., network interface hardware) for carrying out operations of source 12 described herein.

Sources 11 and 12 communicate data streams over a network backbone 13. Backbone 13 may include national and/or regional links, routers, additional media sources, etc. Data streams communicated by sources 11 and 12 over backbone 13 may be received at a central office 14 (e.g., a head-end) of an access sub-network 15 (e.g., an HFC, fiber optic, or wireless access sub-network). Those data streams, together with data streams from other sources (not shown) are multiplexed, modulated and transmitted over access sub-network 15 to a destination device 17 located at a destination premises 16 (e.g., a user's home, a business or an institution). Destination device 17 may demodulate the signals received over access sub-network 15 and extract a video asset data stream for an asset selected by a user. As will be described in more detail in connection with FIG. 2, destination device 17 may then decode that data and generate signals for output of the selected asset on a display device 18, for example. Display device 18 and destination device 17 may be incorporated into a single device, or each may be a stand-alone unit. Destination device 17 may also store received data in a memory, and/or transfer a copy of that data to a transferee device 19.

For simplicity, FIG. 1 only shows two media sources 11 and 12, a single access sub-network 15, and a single destination premises 16 having a single destination device 17. Network 10 may include numerous additional media sources. Moreover, sources 11 and 12 could be in a single physical location. For example, sources 11 and 12 could be implemented as different software routines executing on a single computer. Access sub-network 15 may serve numerous additional destination premises throughout a particular region, and one or more of those premises may include multiple destination devices capable of simultaneously receiving and/or transmitting signals in sub-network 15. Network 10 may also include numerous additional access sub-networks, with each of those sub-networks also serving numerous destination devices. Various routers and other network elements may be located in backbone 13 or elsewhere in network 10. Because the operation of such devices is known or would be readily apparent to a person of ordinary skill in light of the disclosures herein, such devices are not shown in FIG. 1 or further discussed.

Figure 2:
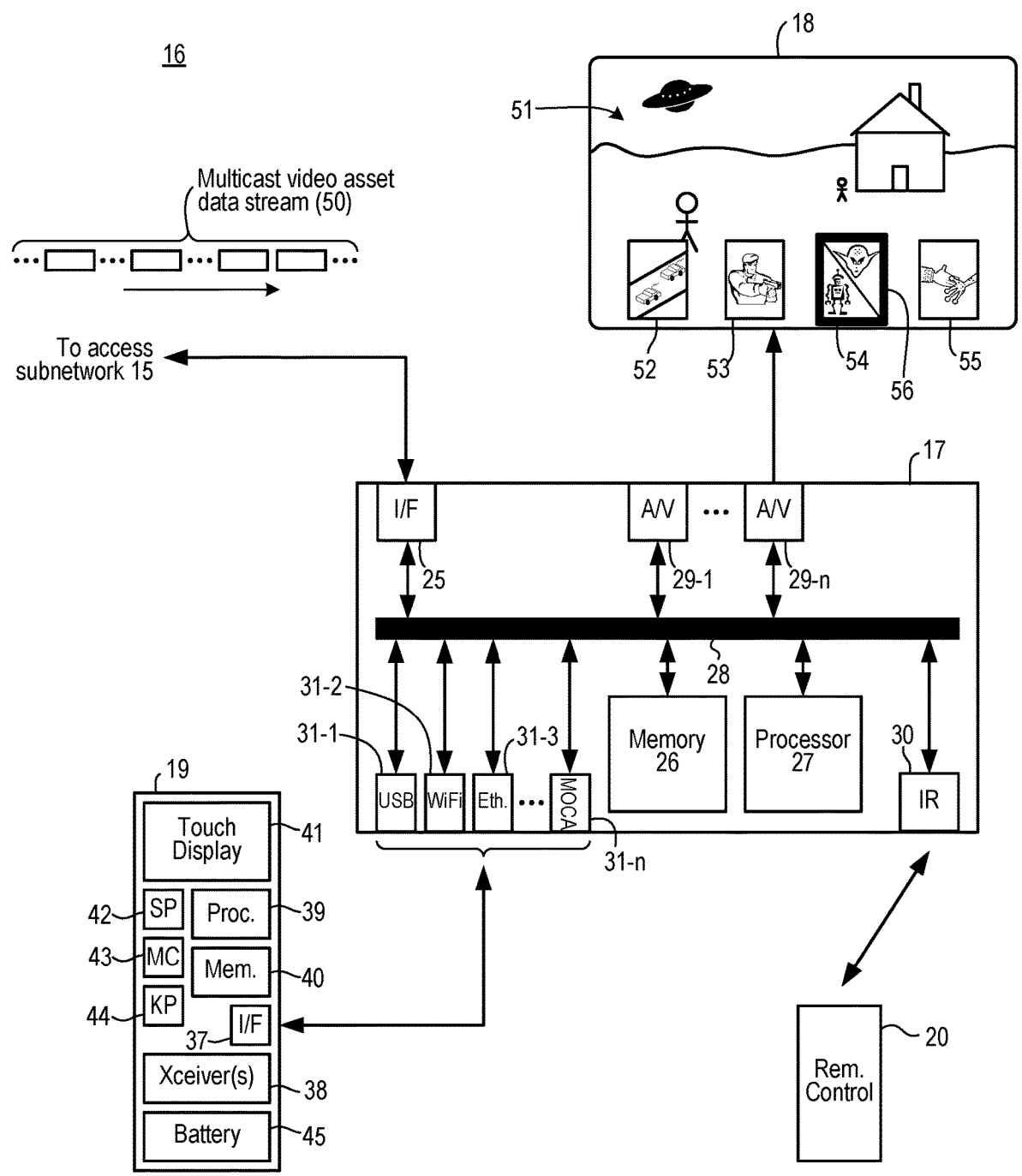
FIG. 2 is a block diagram showing elements at a destination premises according to some embodiments.

FIG. 2 is a block diagram showing additional details of devices at destination premises 16, as well as display of a video asset and associated graphical descriptors, according to some embodiments. In the example of FIG. 2, devices at destination premises 16 include an STT destination device 17, a transferee device 19, a television display device 18, and a remote control handset 20. As discussed below, other types of devices could operate as destination device, as a transferee device, and as a display device.

Destination device 17 communicates with network 10 over sub-network 15 and includes an interface (I/F) 25 that provides a physical connection to the communication medium of access sub-network 15. If for example, the access sub-network 15 is an HFC network, interface 25 may provide an RF interface for communication over coaxial cable. If access sub-network 15 is a Fiber To The Premises (FTTP) Passive Optical Network (PON), interface 25 may provide an optical interface for communication over an optical fiber. If access sub-network 15 is a wireless network, interface 25 may provide an RF interface for communication over free space. If access sub-network 15 is a Digital Subscriber Line (DSL) network, interface 25 could include a DSL modem. Interface 25 could also include a data connection (e.g., an Ethernet port) that permits destination device 17 to communicate with a separate device (e.g., an optical network terminal (ONT), a separate modem, a separate transceiver) that communicates over access sub-network 15. Interface 25 can include hardware for tuning to different channels (e.g., RF frequency channels, optical wavelengths), for demodulating signals received in those tuned channels, and for outputting data from demodulated signals for further processing. Interface 25 also may include components for modulating data onto an upstream signal and transmitting that signal to network 10.

Destination device 17 further may include memory 26 for storing instructions and data and a processor 27 for executing instructions and controlling operation of device 17. Although a single block is shown for memory 26 and a single block shown for processor 27, memory and operations of device 17 could respectively be distributed across multiple memory devices and multiple processors located within device 17. For example, device 17 may include additional processors for executing video and audio CODEC (compressor/decompressor) routines, etc. Memory 26 may include volatile and non-volatile memory and can include any of various types of storage technology, including but not limited to read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. Processor 27 may be implemented with any of numerous types of devices, including but not limited to general purpose microprocessors, application specific integrated circuits, field programmable gate arrays, and combinations thereof. In at least some embodiments, processor 27 carries out operations of destination device 17 described herein according to machine readable instructions stored in memory 26 and/or stored as hardwired logic gates within processor 27. Processor 27 may communicate with and controls memory 26 and interface 25 over one or more buses 28. Device 17 also may include one or more audio and/or video interfaces 29-1 through 29-$n$ (e.g., left and right audio channel outputs, a video output, an HDMI output) over which signals are output for presentation of video content on television 18 and presentation of audio content on one or more speakers (not shown). An interface 30 (e.g., an infrared or RF interface) receives input from remote control handset 20. Other types of input devices (e.g., a computer mouse, a gesture-responsive controller) could also be supported by device 17.

Processor 27 may also communicate with peripheral interfaces 31-1 through 31-$n$ over bus 28. Device 17 may use peripheral interfaces 31-1 through 31-$n$ to communicate with other devices (such as, but not limited to, transferee device 19). Each of interfaces 31-1 through 31-$n$ may include appropriate hardware and stored instructions for sending and receiving communications according to a defined standard and for passing such communicated data to and from processor 27 and/or memory 26. In the example of FIG. 2, interface 31-1 is a Universal Serial Bus (USB) interface, interface 31-2 is an IEEE 802.11 WiFi interface, interface 31-3 is an Ethernet interface, and interface 31-$n$ is a Multimedia over Coax Alliance (MOCA) interface. Other types of peripheral communication interfaces could be employed. Processor 27 also controls operation of interfaces 31-1 through 31-$n$.

Memory 26 of device 17 can be used to store instructions and data used by device 17 to carry out conventional operations such as decoding content data, generating VOD commands and other information for communication to elements in network 10, providing an electronic program guide (EPG), etc. Memory 26 can also be used to store video asset data for later playback (retrieval and decoding to view content encoded by such data). In addition to data used for conventional operations, memory 26 may also store graphical descriptor data. Processor 27 decodes graphical descriptor image data for display on television 18 or another display device and performs operations based on related graphical descriptor metadata, as discussed below.

Data storage and processing operations described herein for device 17 could also be distributed across memory and processing components located in other devices (e.g., a computer, a second STT, a transferee device such as device 19, etc.). Such other device(s) could be in communication with device 17 in a local network or could be in communication with device 17 via network 10.

Transferee device 19 can communicate with destination device 17 over one of interfaces 31-1 through 31-$n$ to download content data and related graphical descriptor data, as also discussed below. In the embodiment of FIG. 2, device 19 may be a "smart" phone or other mobile communication device and that includes memory, processing, display and other components and capabilities such as are described herein for device 19. Device 19 includes an interface 37 that corresponds to the one of interfaces 31-1 through 31-$n$ over which device 19 communicates with device 17. Device 19 can use interface 37 to receive data transferred from memory 26 of device 17. Device 19 also includes a transceiver 38 used for direct communication over a wide area wireless network (e.g., a 3G network). Transferee device 19 could also (or alternatively) communicate with device 17 (e.g., to exchange video asset and graphical descriptor data) via that wide area network, network 10 and interface 25. A processor 39 may also be configured to execute instructions so as to perform various operations of device 19 as described herein and to control operation of other components of device 19. Such instructions may be stored in memory 40 as executable instructions and/or as hard wired logic within processor 39. For example, stored in memory 40 are one or more applications that configure processor 39 to communicate with device 17 using interface 37, to decode content data and display video content on display screen 41 and output audio content on speaker 42, to display graphical descriptors and perform operations based on related graphical descriptor metadata, etc. Device 19 further includes a microphone 43, keypad 44 and battery 45.

In the example of FIG. 2, device 17 is receiving numerous multicast data streams containing data for various video assets. Each of those streams could, e.g., carry data for a particular service such as HBO, ESPN, etc., with each service being assigned a virtual channel number that a user can select to begin watching the asset currently carried on a selected service. One of the streams received by device 17 may be multicast video asset data stream 50, which is currently providing content data for video asset 51. The example of FIG. 2 further assumes that a user of device 17 and television 18 has selected video asset 51 for viewing by, e.g., providing input with handset 20 selecting a virtual channel corresponding to stream 50. For simplicity, FIG. 2 does not show other multicast streams that may be communicated to device 17 within the same signal communicating stream 50. Stream 50 also includes graphical descriptor data associated with asset 51.

As multicast stream 50 is received, device 17 extracts data from stream 50, decodes extracted video content data corresponding to asset 51 and generates corresponding signals. Those signals are then output to television 18 over interface 29-$n$ so as to permit television 18 to display content of video asset 51. Device 17 may also store extracted graphical descriptor data from stream 50 in memory 26. In response to a user input from handset 20 while content for asset 51 is being displayed, device 17 may decode the graphical descriptor image data and cause presentation of the corresponding graphical descriptors in conjunction with asset 51 content on a display screen of television 18. In the example of FIG. 2, device 17 has caused such graphical descriptors 52-55 to be displayed at the bottom of the screen. Audio data associated with asset 51 may also be extracted and decoded, and signals generated and sent to a device (e.g., device 18, separate speakers, headphones) for output of the audio associated with asset 51.

Each of graphical descriptors 52-55 may be an image that provides a graphical description of a different portion of content in asset 51, which a user can select to navigate to that content portion. In the present example, asset 51 is a movie having a run-time (duration) of T minutes. In other words, if asset 51 is continuously displayed without interruption and at the proper rate, the movie would begin at time 0 and end T minutes later. In the present example, graphical descriptor 52 describes a portion of asset 51 that commences 0.2T minutes after the asset 51, e.g., a movie, begins. Descriptors 53, 54 and 55 respectively describe portions of asset 51 that commence 0.4T, 0.6T and 0.8T minutes after the movie begins.

The image in a particular descriptor can be an actual frame taken directly from the described portion of asset 51, as shown with graphical descriptor 52. This need not be the case, however. As one example, and as shown by descriptor 54, an image that combines elements from multiple frames within a described portion of asset 51 may provide a more desirable description than any individual frame. As another example, and as shown by descriptor 53, a specially-prepared still image of an actor may show an important character from a scene better than any actual frame of the asset. As yet another example, and as shown by descriptor 55, specially prepared artwork may symbolically represent events in a portion of the content. Other types of graphical descriptors could also (or alternatively) be used. A graphical descriptor and/or its related metadata may also be linked to a particular frame or sequence of frames in an asset in such a manner as to cause the graphical descriptor to only be displayed during that particular frame or sequence of frames.

With regard to each of graphical descriptors 52-55, the related graphical descriptor metadata stored in memory 26 may include pointer data that identifies the described portion of asset 51. For example, stored metadata relating to descriptor 52 may include an identifier of asset 51 and a time index of asset 51 corresponding to 0.2T minutes from the asset beginning. As further explained below, this metadata can be used (upon selection of descriptor 52) to cause display of the part of asset 51 that begins at time 0.2T. The stored metadata relating to descriptors 53-55 similarly may include an asset 51 identifier and pointers (e.g., time indices) corresponding to relevant portions of asset 51. The metadata related to each graphical descriptor may also include other types of data. For example, the metadata relating to a descriptor could include a synopsis or other textual description of a scene or other content portion that corresponds to that descriptor. The textual description could be displayed in conjunction with the graphical descriptor (either automatically or in response to an additional user input). In some embodiments, the graphical descriptor metadata relating to each graphical descriptor may include an address in network 10 for unicast source 12 and/or for other elements in network 10.

After graphical descriptors 52-55 are displayed, a user may select one of the descriptors to indicate a desire to skip ahead (or back) to a particular portion of asset 51. For example, and as shown in FIG. 2, a user can highlight graphical descriptor 54 with cursor 56 by, for example, pressing arrow buttons (not shown) on handset 20. After highlighting graphical descriptor 54, the user may provide an input on handset 20 indicating selection of the asset 51 portion corresponding to descriptor 54. Upon receiving data indicative of this input, processor 27 of device 17 may generate a request message that includes the asset 51 identifier and the time index included in the metadata related to graphical descriptor 54. Device 17 may then transmit that request message upstream to unicast source 12 or to another appropriate element in network 10. In response to the request message from device 17 (or in response to a message from another element resulting from the device 17 request message), unicast source 12 begins transmitting a unicast video asset data stream to device 17 that includes content data for asset 51. However, the content data in that stream from source 12 begins at a point corresponding to the time index included in the request message.

Figure 3:
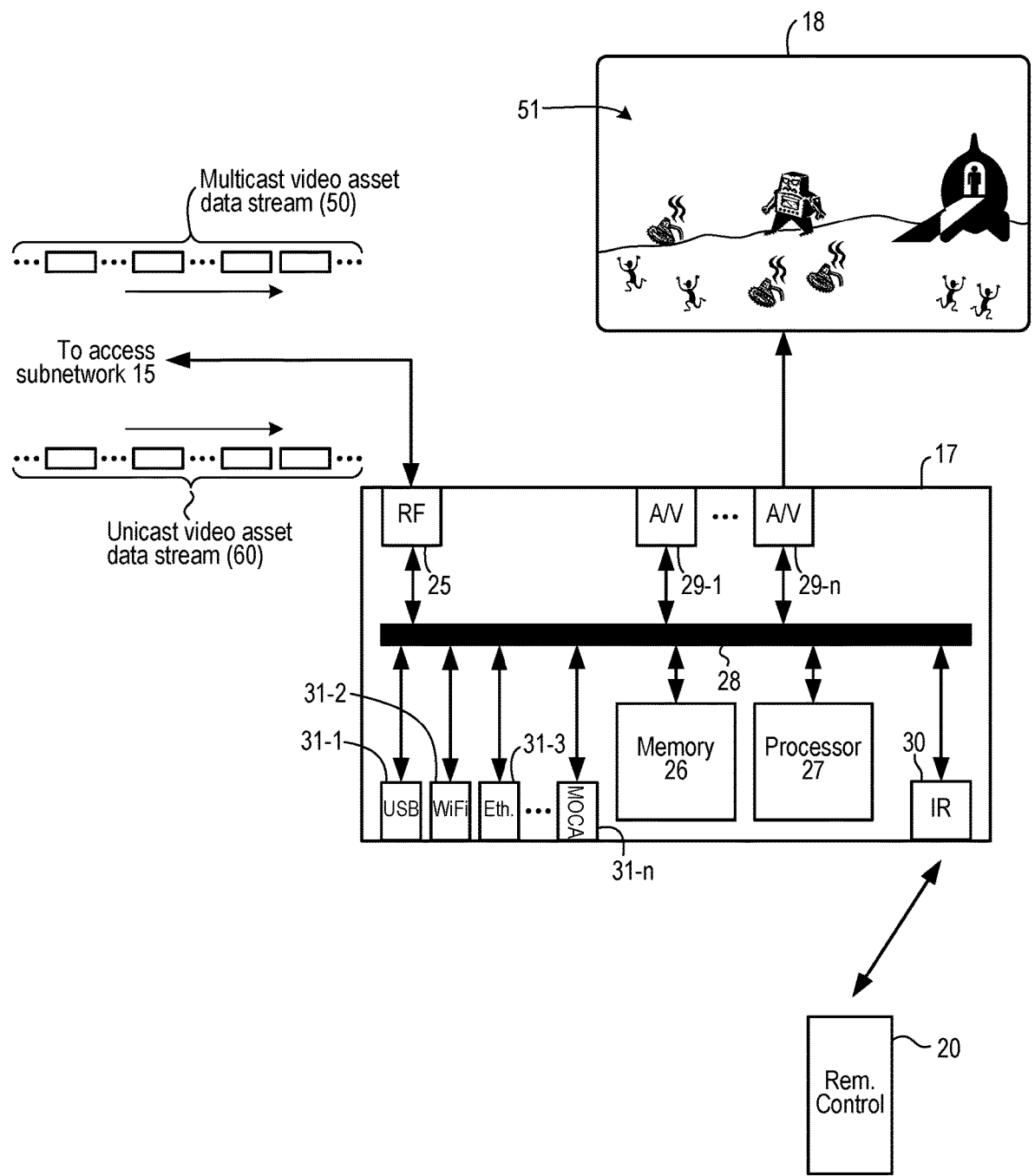
FIG. 3 is another block diagram showing elements according to some embodiments.

FIG. 3 is a block diagram showing device 17 and television 18 after source 12 begins transmitting a unicast video asset data stream 60 in response to the request from device 17. A unicast video asset data stream may be transmitted according to either a push or a pull model. For convenience, device 19 is omitted from FIG. 3. The data in unicast stream 60 contains data for asset 51 beginning at the time index taken from the graphical descriptor metadata related to selected graphical descriptor 54 (FIG. 2) and included in the request message sent by device 17. Upon selection of graphical descriptor 54 by the user, device 17 may stop decoding data from multicast stream 50. Upon receipt of the signal containing stream 60, device 17 begins, for example, extracting stream 60, decoding data from unicast stream 60, generating electrical signals using that decoded data, and outputting those electrical signals over A/V interface 29-$n$. As a result, and as also shown in FIG. 3, television 18 starts to display content of asset 51 commencing 0.6T minutes after the beginning of asset 51.

Unicast stream 60 may also contain graphical descriptor data. If so, device 17 may store the graphical descriptor data in stream 60 and process that graphical descriptor data in a manner similar to the graphical descriptor data in stream 50. Graphical descriptor data in stream 60 may be the same or different than the graphical descriptor data in stream 50. If a unicast session is delivered in response to selection of a descriptor in a previously-delivered multicast session, for example, the unicast session could be augmented with additional graphical descriptor data during a post-production process. Such post-production could occur at device 17. A user viewing a unicast stream might also be able to create personal descriptive data (e.g., screen shots from favorite scenes) and store that personal descriptive data for use with future viewings of the asset. Such personal descriptive data could also be shared with friends, etc.

As further shown in FIG. 3, device 17 continues to receive a signal containing multicast video asset stream 50. However, device 17 may simply ignore multicast stream 50 in the same manner as it may ignore numerous other multicast streams carried over access sub-network 15 at any given time. Alternatively, device 17 may store content data and associated graphical descriptor data from multicast stream 50 while simultaneously decoding content data from unicast stream 60 (and while storing graphical descriptor data from stream 60, if present). As but one possible scenario, a first user may have initially configured device 17 to store data from stream 50 so that asset 51 could be played back at a later date. While device 17 is recording asset 51 from multicast stream 50, a second user might then turn on television 18 and select multicast stream 50 for viewing (e.g., by providing input to device 17 indicating a virtual channel corresponding to multicast stream 50). The second user might then decide to begin watching asset 51 starting at a different portion of the asset. For example, the second user may have selected the multicast stream 50 virtual channel midway into the runtime of asset 51 and wish to begin watching from the beginning. However, the first user might also wish to continue recording asset 51 from multicast stream 50 so that asset 51 will be available for playback from memory 26 at the first user's convenience. The second user, who will be watching a unicast version of asset 51, may or may not see the same advertisements as are shown in the multicast version of asset 51 being recorded by device 17. Moreover, the version of asset 51 being recorded by device 17 could differ from what a user would see if asset 51 were viewed in real-time as stream 50 is received. For example, stream 50 could include additional data that is automatically stored by device 17 in response to a user command to store asset 51 for later viewing, but which is not extracted from stream 50 if asset 51 is viewed in real time. This additional data could include longer versions of commercials, background video of asset 51, etc.

In the example thus far, and as shown in FIG. 2, graphical descriptors 52-55 associated with video asset 51 describe portions of asset 51 that commence at different points in the run-time of asset 51. This need not be the case, however. In other embodiments, one or more of the graphical descriptors associated with a video asset may describe all or part of a different video asset. As but one example, a video asset may be a movie or television program starring a particular actor. Each of multiple graphical descriptors associated with that asset may be a miniature version of a movie poster or other artwork describing a different movie starring that same actor. Each of those descriptors may in turn have related metadata that contains an identifier and/or a textual synopsis of the movie represented by the descriptor. Upon receipt of user input selecting of one of the descriptors, device 17 could then generate and transmit a request message that causes source 12 (FIG. 1) to begin sending device 17 a unicast video asset data stream that includes the content data for the identified movie. As another example, each of multiple graphical descriptors associated with a movie video asset may be a miniature version of a poster for another movie in the same genre.

Combinations of various types of graphical descriptors (and related metadata) can be associated with a particular video asset. In one embodiment, a video asset of genre A starring actor B is associated with multiple sets of graphical descriptors. A first of those sets may include graphical descriptors, similar to those of FIG. 2, that describe different portions of the video asset. A second of those sets may include graphical descriptors that describe other assets in genre A. A third of those sets may include graphical descriptors that describe other assets starring actor B. In response to data indicative of a first input from a user, device 17 may cause a display of a menu (e.g., on television 18) that allows the user to select a submenu corresponding to one of the graphical descriptor sets. In response to data indicative of a second input selecting a submenu, device 17 then causes display of the graphical descriptors corresponding to that submenu. Upon receipt of data indicative of another user input selecting a displayed descriptor, device 17 generates a request message that includes an asset identifier (or an asset identifier and a time index) from the metadata related to the selected descriptor. After sending that request message upstream, device 17 begins receiving content data for the requested video asset (or asset portion).

A video asset corresponding to a particular graphical descriptor may be available by multicast. For example, each of one or more graphical descriptors could refer to content that is currently available in another multicast data stream. Related graphical descriptor metadata could identify the appropriate multicast stream. In response to data indicative of a user selection of a descriptor referring to content in another multicast stream, processor 27 could generate an internal request that causes extraction of content data (and graphical descriptor data) from the other multicast stream. Under some circumstances, this may occur in order to conserve bandwidth, for example.

Returning to FIG. 2, device 19 can communicate with device 17 via one of interfaces 31-1 through 31-*n*. In some embodiments, device 17 can store content data and associated graphical descriptor data in memory 26. That data (or a copy of that data) can then be transferred to device 19, the transferee device in this example, and stored in memory 40. Device 17 might alternatively transfer such data to transferee device 19 without interim storage on device 17 (or with only incidental buffering or storage on device 17 prior to transfer). Subsequent to receiving and storing the transferred data, device 19 can retrieve content data from memory 40, decode that content data, and cause display of the video asset on display screen 41. Device 19 may also decode graphical descriptor image data stored in memory 40 and generate displays of the graphical descriptors in conjunction with the video asset. In response to a user selection of a graphical descriptor, device 19 can then take appropriate action (e.g., begin displaying the video asset from a point corresponding to the graphical descriptor). In some embodiments, device 19 may include one or more application programs stored in memory 40 that permit processor 39 to decode and process content data, graphical descriptor image data and metadata in the form received from network 10 (FIG. 1). In such an embodiment, device 17 can simply store such data in memory 26 as it is received, and then transfer that data to memory 40 of device 19 without significant modification. In other embodiments, device 17 may modify data received from network 10 prior to transferring such data to device 19. For example, data received by device 17 from network 10 may be encrypted, and device 17 may decrypt that data. As another example, device 17 may separate the data for the video (and audio) content of an asset from the associated graphical descriptor data. Device 17 may then transcode the content data by decoding it and then recoding it using a different type of CODEC. Device 17 may also modify the content data for a particular transferee device, e.g., to better suit a smaller display screen or a display screen with a different aspect ratio. The graphical descriptor metadata related to graphical descriptor image data may be converted to a different form (e.g., XML) and the graphical descriptor image data marked to accommodate any conversion of the related metadata.

Figure 4A:
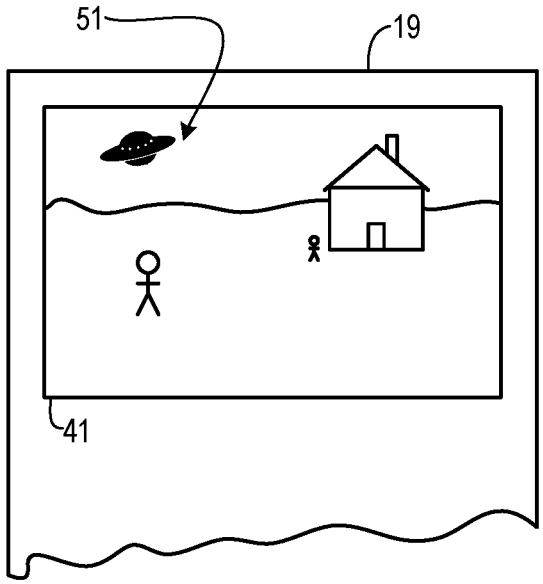
FIGS. 4A through 4D illustrate one manner in which an exemplary transferee device may use data and metadata for an asset according to some embodiments.
Figure 4B:
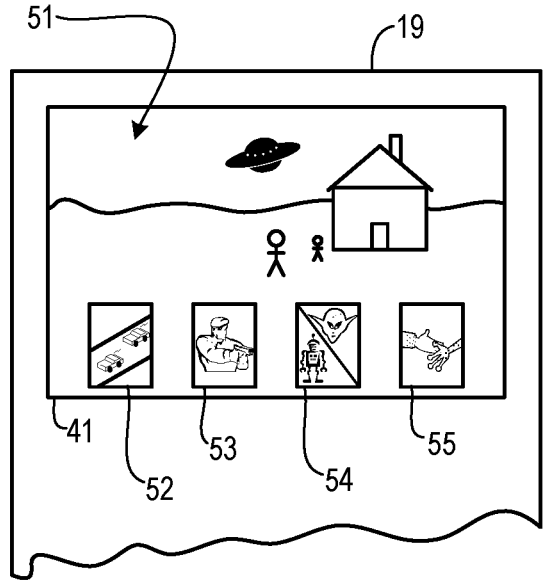
Figure 4C:
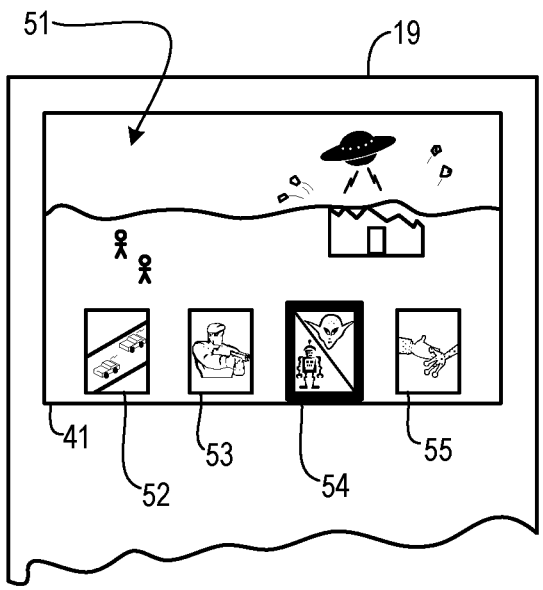
Figure 4D:
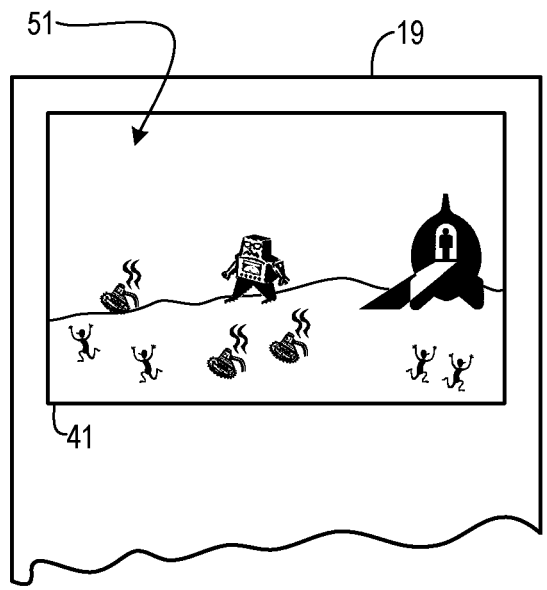

FIGS. 4A-4D illustrate one manner in which transferee device 19 may use content data and graphical descriptor data for a video asset after transfer of such data, e.g., to memory 40 from device 17. At some time subsequent to storing such data for asset 51 in memory 40 of device 19, a user may provide an input (e.g., via keypad 44) indicating a desire to view asset 51. In response, and as shown in FIG. 4A, processor 39 of device 19 begins retrieving and decoding content data stored in memory 40 and causes the corresponding content of asset 51 to be displayed on screen 41. Subsequently, the user provides another input indicating a desire to access a menu providing options for displaying different portions of asset 51. In response, and as shown in FIG. 4B, processor 39 of device 19 decodes graphical descriptor image data, stored in memory 40, for example, and causes display of graphical descriptors 52-55 on display 41. The user next provides an input highlighting and selecting descriptor 54 (FIG. 4C). In response, processor 39 determines a time index from graphical descriptor metadata related to descriptor 54 and stored in memory 40. Processor 39 then begins retrieving and decoding content data for the portion of asset 51 identified by that time index and causes display of the corresponding content on display screen 41 (FIG. 4D).

Device 19 may also be configured to display graphical descriptors, in conjunction with playback of a first asset from content data in memory 40, that describe different assets and that have related metadata pointing to those different assets. In response to selection of such a descriptor, device 19 could take various types of action. If a descriptor selected during first asset playback has related metadata pointing to a different asset for which content data is also stored in memory 40 of device 19, processor 39 could stop playback of the first asset and begin playback of the different asset. If a selected descriptor has related metadata pointing to a different asset for which content data is not stored in memory 40, processor 39 may prompt the user for authorization to download the different asset using transceiver 38. As another possibility, processor 39 may prompt the user for authorization to cause source 12 (or another source in network 10) to transmit the content to device 17 for recording in memory 26. If the user of device 19 provides authorizing input, processor 39 can send one or more messages to elements in network 10 using transceiver 38. In response to those messages, an element in network 10 can begin transmission of a data stream containing content for the desired video asset, and a signal can be sent to device 17 instructing device 17 to record that data stream. After the content data for the desired asset has been stored in memory 26 of device 17, a copy of that data can be transferred to memory 40 of device 19 by connecting device 19 (using interface 37) and device 17 (using one of interfaces 31).

In some embodiments, device 17 can also operate in a manner similar to that described for transferee device 19. For example, device 17 may retrieve and decode video asset data and associated graphical descriptor data from local storage in memory 26 and cause display of the asset and its associated graphical descriptors. When a user selects one of those displayed graphical descriptors, device 17 may then cause a jump to a portion of the asset identified by a time index associated with the selected descriptor by retrieving and decoding a different portion of the asset data from memory 26. As another example, selection of a graphical descriptor while replaying content data from memory 26 could cause device 17 to begin decoding and outputting video for a different asset stored in memory 26, or may cause device 17 to transmit a message to initiate transmission of a stream containing a different asset.

FIG. 5A is a diagram showing four packets 101-104 of a video asset data stream 100 according to at least one embodiment. In the example embodiment of FIG. 5A, stream 100 is an MPEG-2 transport stream carrying the video content data for a particular asset. As with conventional MPEG-2 transport streams, each of the packets in stream 100 includes a field 110 that contains a Packet IDentifier ("PID") used by a receiving device to isolate stream 100 from numerous other streams that might be multiplexed together. In a conventional MPEG-2 transport stream carrying video content data, a packet contains a plurality of variable-length Packetized Elementary Stream (PES) blocks containing data that encodes the video content. Unlike conventional MPEG-2 transport streams, however, certain PES blocks in certain packets of stream 100 are designated as graphical descriptor data blocks. Those graphical descriptor data blocks are then used to hold graphical descriptor data associated with the video asset data in other PES blocks of stream 100 packets. Graphical descriptor data blocks are shown FIG. 5A with cross-hatching. Specifically, the first PES block 111 of packet 101 and the first PES block 112 of packet 104 are graphical descriptor data blocks. Blocks 111 and 112, as well as other graphical descriptor data blocks in stream 100, are marked in an appropriate manner to indicate the contents of the block. In some embodiments, one or more fields in a PES block header can hold a value indicating that the block is a graphical descriptor data block and not a conventional PES block.

Although the example of FIG. 5A shows graphical descriptor data blocks as the first PES blocks in packets, this need not be the case. Indeed, and because a graphical descriptor data block is marked to distinguish it from other PES blocks, graphical descriptor data blocks can be located in different positions from packet to packet. Moreover, more than one PES block in a packet could be used as a graphical descriptor data block.

As can be seen in FIG. 5A, every packet in a video asset data stream need not contain a graphical descriptor data block. In at least some embodiments, the image data for a single graphical descriptor and its related metadata may be only two to four kilobytes in size. This is very small relative to the size of the video content data for most video assets. This can permit transmission of all graphical descriptor data associated with a particular video asset in a negligible amount of time. For example, all graphical descriptor data associated with a movie video asset could be transmitted in the first few seconds of the movie. In some embodiments, however, the graphical descriptor data associated with an asset are repeatedly transmitted (e.g., every five minutes). For example, a user of device 17 may begin viewing an asset after it has commenced, and thus device 17 may not have stored graphical descriptor data that was transmitted at the start of the asset. However, that graphical descriptor data can be stored when it is received in a repeat transmission occurring after the user has started viewing the asset. Thus, even if a user did not view a previously-transmitted portion of an asset when it was initially transmitted as part of a multicast stream, the user can jump back to that previously-transmitted portion by selecting a graphical descriptor corresponding to retransmitted graphical descriptor data. In response, a unicast transmission of that previously-transmitted asset portion can be initiated, as described herein, for example.

FIG. 5B is a diagram showing communication of graphical descriptor data according to another embodiment. In the example of FIG. 5B, video content data for an asset is carried in packets of a first MPEG-2 transport stream 150. Four blocks 151-154 of stream 150 are shown. As with other packets in stream 150, each of blocks 151-154 may include a field 160 that contains a PID for the video asset data stream. Graphical descriptor data are carried in packets of a separate data stream 170. Two packets 171 and 172 of stream 170 are shown. Each packet in stream 170 includes a field 180 that contains a PID that identifies packets as carrying graphical descriptor data associated with the video asset of stream 150. Included in each packet of stream 170 are one or more graphical descriptor data blocks (181, 182). For example, a program map table carried in a different stream (not shown) may inform destination devices of the PIDs for streams 150 and 170.

As with the embodiment of FIG. 5A, the image data for a single graphical descriptor and its related metadata in the embodiment of FIG. 5B is of very small size relative to the size of the video content data for most video assets. This permits communication of all graphical descriptor data associated with a particular asset in a relatively short group of stream 170 packets. Such a packet group can be communicated to and processed within a destination device in a few seconds. In some embodiments, a group of packets containing all graphical descriptor data associated with an asset is communicated in stream 170 when the first packets of stream 150 are communicated. At periodic intervals (e.g., every few minutes), another group of packets containing the same graphical descriptor data could be sent.

When a group of blocks containing all graphical descriptor data for an asset can be communicated quickly relative to the runtime of the associated video asset, and at least with regard to repeat transmission of such graphical descriptor data block groups during the asset runtime, there is no need to synchronize graphical descriptor data block transmission with a specific portion of an associated video asset.

FIGS. 5A and 5B only represent some examples of techniques by which graphical descriptor data and related graphical descriptor metadata associated with a video asset can be communicated in an MPEG-2 transport stream. Other embodiments utilize MPEG-2 transport streams in different manners. Still other embodiments do not use MPEG-2 transport streams at all. For example, content data for a video asset and associated graphical descriptor data can be communicated in a single stream using internet protocol (IP) frames.

Graphical descriptor data can be formatted so as to accommodate a particular type of application program within a destination device. In some embodiments, for example, a destination device can include one or more EBIF (Enhanced TV Binary Interchange Format) applications that process graphical descriptor image data and related graphical descriptor metadata. As another example, a destination device can include one or more OCAP (OpenCable Application Platform) applications that process graphical descriptor data.

Figure 6:
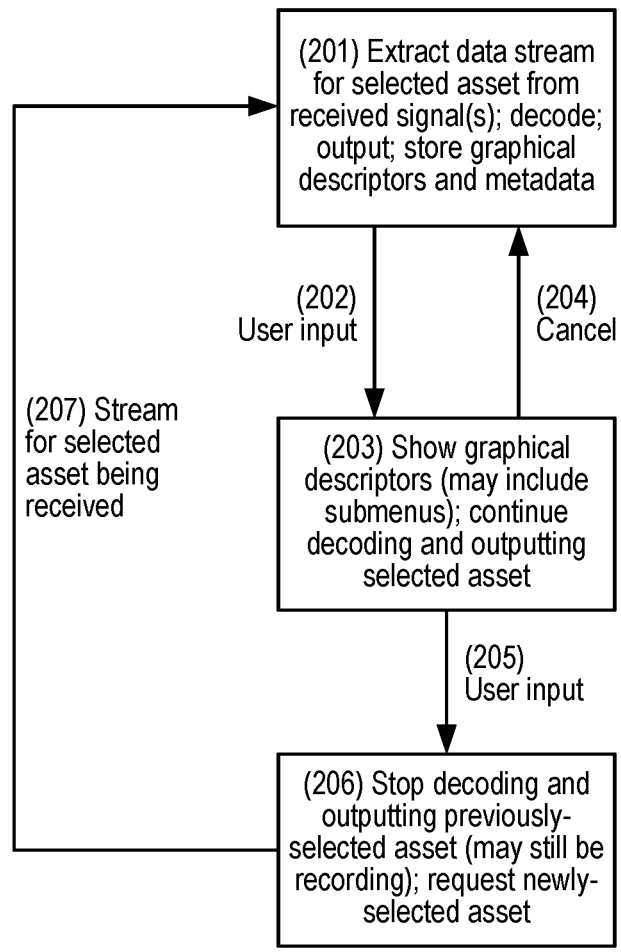
FIG. 6 is a state diagram showing various operations performed by a destination device according to some embodiments.

FIG. 6 is a state and flow diagram showing various operations that may be performed by destination device 17 according to some embodiments. As shown in block 201, device 17 receives a signal and extracts a data stream from that signal. The extracted data stream may contain video content data for an asset that has been selected by user, as well as graphical descriptor data associated with the selected asset. Device 17 decodes the extracted video content data and generates electrical signals, for output to television 18 or another display device, to cause display of the selected asset content. Device 17 may also store the graphical descriptor data in memory 26. As indicated above, all graphical descriptor data associated with a particular asset may be transmittable in a short period of time. Accordingly, device 17 need not continuously store such graphical descriptor data. After a complete set of the graphical descriptor data is received, device 17 could simply ignore any retransmission of that same graphical descriptor data. Device 17 need not perform all of the functions shown in block 201 (or other blocks), and may selectively perform some tasks but not others.

The data stream extracted by device 17 in block 201 may be a multicast stream (such as stream 50 in FIG. 2) or may be a unicast stream. In at least some embodiments, video assets available from a VOD server or other type of unicast source also have associated graphical descriptor data.

In response to data indicative of a user input (e.g., from handset 20 shown in FIG. 2), and as shown by path 202, device 17 transitions to the state of block 203. In this state, device 17 continues to decode video content data and output corresponding electrical signals to television 18. However, device 17 also may decode graphical descriptor image data and cause display of graphical descriptors in conjunction with content of the selected asset. Device 17 may further cause display of textual information with one or more graphical descriptors based on information (e.g., synopses) contained in related graphical descriptor metadata. While in the block 203 state, device 17 may cause display of one or more submenus having different sets of graphical descriptors.

If the user decides not to select a displayed graphical indicator, and as shown by path 204, data indicative of an appropriate user input (e.g., pressing of a "cancel" or "exit" button on handset 20) returns device 17 to the block 201 state. If the user instead provides an input selecting one of the displayed graphical indicators, device 17 may transition on path 205 to the state of block 206. In the block 206 state, device 17 stops decoding video content data for the previously selected asset. If device 17 was recording that asset, however, the recording may continue. Device 17 may also generate a request message that contains an asset identifier from the metadata related to the selected graphical indicator. That identified asset may be the same as the previously selected asset or may be a different asset. If the identified asset is the same as the previously selected asset, the request message may also include a pointer (e.g., a time index) to a particular portion of the asset. Device 17 may then send the generated request message to source 12 or to another appropriate element in network 10.

In response to the request message, source 12 may begin transmitting a unicast data stream containing content data for the asset identified in the request message. Upon detecting that unicast stream, and as shown by path 207, device 17 returns to the block 201 state and begins performing the operations of that state on the received unicast data stream.

Device 17 may perform similar operations when playing back content previously stored in the memory 26 of device 17. In the block 201 and block 203 states, for example, device 201 may simply retrieve video content data for the selected asset from memory 26 instead of extracting that data from a signal received over access sub-network 15. Device 17 may also perform similar operations if video content data for a selected asset were carried in one stream and associated graphical descriptor data were carried in a separate stream. In the block 201 and block 203 states, device 17 may simply extract data from both of those streams. If a selected graphical indicator corresponds to an asset for which data is being carried in another multicast stream, the request generated in the block 206 state may be an internal request that causes device 17 to begin extracting content data and graphical descriptor data from that other multicast stream, with path 207 then representing initial detection by processor 27 of such extraction.

Figure 7:
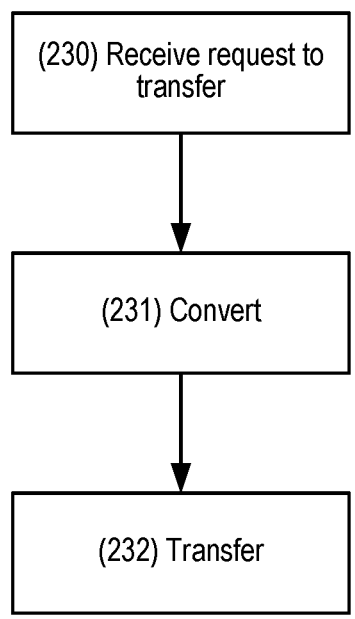
FIG. 7 is a flow chart showing operations associated with transferring a copy of content data and associated graphical descriptor data according to some embodiments.

FIG. 7 is a flow chart showing operations that may be performed by destination device 17 when transferring a copy of content data and associated graphical descriptor data to device 19 or to another transferee device. In block 230, device 17 receives a request from device 19 (via one of interfaces 31) requesting download of a particular asset. In block 231, device 17 performs any necessary conversion of the content data and associated graphical descriptor data corresponding to the requested asset. This conversion can include conversion of EBIF, OCAP or other application data and/or related signaling. In some embodiments, some or all of the operations of block 231 may alternately have been performed previous to block 230, for example, in anticipation of a future request for the corresponding asset. In still other embodiments (e.g., where a transferee device and device 17 can process data in the same format), some or all of the operations of block 231 may not be performed. In block 232, content data and associated metadata for the requested video asset are transferred to device 19.

Figure 8:
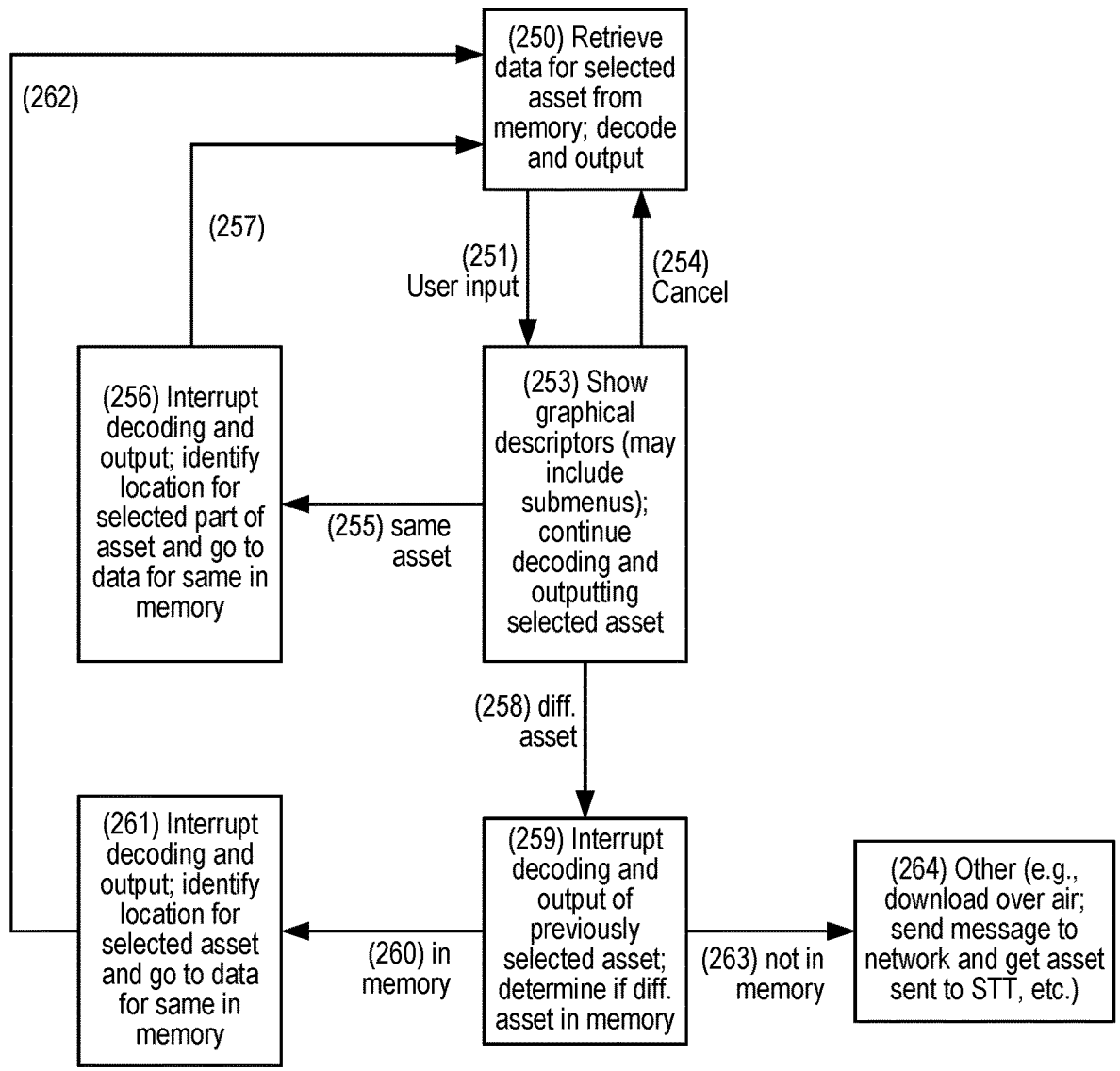
FIG. 8 is a state diagram showing various operations performed by a transferee device according to some embodiments.

FIG. 8 is a state diagram showing various operations that may be performed by transferee device 19 according to some embodiments. FIG. 8 assumes that content data and associated graphical descriptor data for a first asset have previously been stored in memory 40 (or another storage) of device 19. FIG. 8 further assumes that a user of device 19 has previously provided input (e.g., via keypad 44) selecting the first asset for presentation on display screen 41. In the state of block 250, processor 39 may retrieve content data for the first asset from memory 40, decode that content data, and cause presentation of the corresponding first asset content on display screen 41. In response to another user input, and as shown by path 251, device 19 transitions to the state of block 253.

In the block 253 state, device 19 may continue to decode video content data for the first asset and continue to present corresponding first asset content on display screen 41. However, device 19 may also decode graphical descriptor image data and cause display of graphical descriptors in conjunction with content of the first asset. Device 19 may further cause display of textual information with one or more graphical descriptors based on information (e.g., synopses) contained in related graphical descriptor metadata. While in the block 253 state, device 19 may cause display of one or more submenus having different sets of graphical descriptors.

If the user decides not to select a displayed graphical indicator, and as shown by path 254, an appropriate user input (e.g., pressing a key of keypad 44), for example, may return device 19 to the block 250 state. If the user instead provides an input selecting one of the displayed graphical indicators, device 19 may determine if the selected graphical indicator describes the first asset (currently being presented on screen 41) or a different asset. If the selected descriptor corresponds to the first asset, and as shown by path 255, device 19 may transition to the state of block 256. In the block 256 state, device 19 may interrupt decoding of first asset content data and presentation of the first asset on display screen 41. Device 19 may also identify a portion of the first asset described by metadata related to the selected graphical descriptor and locate first asset content data in memory 40 that corresponds to the identified portion. Device 19 then returns to the block 250 state (as shown by path 257), and may resume decoding content data using the first asset content data located in state 256, and resume causing presentation of corresponding first asset content on display screen 41.

If device 19 determines in the block 253 state that the selected graphical descriptor corresponds to a second asset that is different from the first asset, device 19 may transition to the state of block 259 (as shown by path 258). In the state of block 259, device 19 may interrupt decoding of first asset content data and presentation of the first asset on display screen 41. Device 19 may then determine if data for the second asset is stored in memory 40 (or another memory). If so, and as shown by path 260, device 19 transitions to the state of block 261. In the block 261 state, device 19 may locate second asset content data in memory 40 that corresponds to the selected graphical descriptor. Device 19 then returns to the block 250 states (as shown by path 262), and may resume decoding content data using the second asset content data located in state 261, and causes presentation of corresponding second asset content on display screen 41.

If device 19 determines in the block 259 state that data for the second asset is not stored in memory 40, and as shown by path 263, device 19 may transition to the state of block 264. In the state of block 264, device 19 may take other appropriate action. As indicated above, such action could include prompting the user for authorization to download second asset content data over the air, to request transmission of second asset content data to device 17 for later transfer to device 19, etc.

In some embodiments, video asset data and associated graphical descriptor data may be transferred from device 19 to device 17 or to another device. For example, device 19 may perform operations similar to those described in connection with FIG. 7. Moreover, various operations described in blocks of FIGS. 7 and 8 might be performed elsewhere. As but one example, conversion operations described in connection with block 231 (FIG. 7) could alternatively be performed in device 19 or in a third device.

The above examples only represent some embodiments of the techniques and apparatuses disclosed herein. In other embodiments, and as indicated above, other types of destination devices may operate in other types of networks. Other types of access sub-networks in which other embodiments may be implemented include (but are not limited to) FTTH passive optical networks, DSL (digital subscriber line) networks, wide area wireless networks, satellite networks, etc. Other types of destination devices include (but are not limited to) general purpose computers that may communicate with an access sub-network using one or more intermediate devices (e.g., a cable modem, a DSL modem, an Optical Network Terminal (ONT), a wide area wireless network transceiver), specialized media terminals, a media gateway, etc. Other types of transferee devices could include laptop or notebook computers, personal digital assistants (PDAs), portable media players, etc., as well as devices that might not be considered "mobile" (e.g., a desktop computer, a second STT). Transferee device could communicate with device 17 via a direct connection to an interface of device 17, via a local network that includes device 17, and/or via network 10 and interface 25. A destination device and one or more display devices could be combined into a single device. In at least some other embodiments utilizing different types of destination device and/or access network and/or transferee device, those devices perform operations similar to those described above in connection with destination device 17, television 18 and transferee device 19.

As another example, additional embodiments include utilization of an auxiliary device to only present graphical descriptors to a user. For example, such an auxiliary device could be used to display graphical descriptors contained in one or more streams currently being received by device 17 (FIG. 2). In response to seeing a graphical descriptor on the auxiliary device representing content of interest, a user might then decide to activate another device (e.g., television 18) and watch that content. The auxiliary device could be dedicated to providing graphical descriptors (e.g., similar to a digital picture frame). The auxiliary device might alternatively be a device that is capable of outputting video and audio content and/or of performing other functions (e.g., a general purpose computer). In still other embodiments, a device such as television 18 or a general purpose computer could have an operational mode in which only graphical descriptors are displayed. A user seeing a displayed descriptor representing content of interest could then place the television, computer or other device into a different mode in which the content can be viewed.

In some embodiments, a transferee device (e.g., device 19 in FIGS. 2 and 3) may not store content and descriptor data in local memory, or may only buffer such content and descriptor data as long as may be necessary for purposes of an active display. In this manner, a transferee device could be used as an additional device with which to view content and descriptors initially received by device 17. Device 17 may still store data for such content and descriptors (and/or may perform transcoding or other data conversion operations) prior to transferring same to device 19. As previously indicated, device 17 may in some embodiments transfer content and descriptor data to transferee device 19 without interim storage on device 17, or may only buffer or otherwise store such data for a short period (e.g., for purposes incidental to transcoding or format conversion).

Embodiments also include one or more machine-readable storage media (e.g., a CD-ROM, CD-RW, DVD, floppy disc, FLASH memory, RAM, ROM, magnetic platters of a hard drive, etc.) that store instructions executable by one or more processors to carry out one or more of the operations described herein. As used herein (including the claims), a tangible machine-readable storage medium is a physical structure that can be touched by a human. A modulated signal would not by itself constitute a tangible machine-readable storage medium.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. All embodiments need not necessarily achieve all objects or advantages identified above. Any and all permutations of various features described herein are within the scope of the invention. The features of the embodiments described herein may be combined in all possible combinations of methods, apparatus, modules, systems, and computer program products.

The invention claimed is:

1. A method comprising:
 causing, by a first computing device and based on graphical descriptor data associated with a first video, presentation of a timeline of selectable images, wherein the timeline comprises:
  a plurality of selectable images that correspond to different time points of the first video, wherein a first image, of the plurality of selectable images, comprises:
   at least a portion of one or more images of the first video; and
   artwork associated with the first video, wherein the artwork is based on the one or more images of the first video; and
  a second image that corresponds to a second video, different from the first video; and
 causing, after receiving an indication of a user selection of the second image, presentation of the second video.

2. The method of claim 1, further comprising:
 generating the first image based on recognizing a character in the first video.

3. The method of claim 1, wherein the first image comprises images from multiple frames of the first video.

4. The method of claim 1,
 wherein the second image is generated based on one or more second images of the first video.

5. The method of claim 1, further comprising:
 causing concurrent presentation of the first image and a textual description of a scene corresponding to the first image.

6. The method of claim 1, further comprising removing the first image from the timeline based on the one or more images of the first video no longer being presented.

7. The method of claim 1, further comprising removing the first image from the timeline based on progress of the first video.

8. The method of claim 1, wherein the first image comprises images from a plurality of different content items.

9. The method of claim 1, further comprising receiving the first video via a Moving Picture Experts Group (MPEG) packetized elementary stream.

10. The method of claim 1, further comprising:
 receiving the graphical descriptor data interleaved with blocks of the first video.

11. One or more non-transitory computer-readable media storing instructions that, when executed, cause:
 causing, by a first computing device and based on graphical descriptor data associated with a first video, presentation of a timeline of selectable images, wherein the timeline comprises:

a plurality of selectable images that correspond to different time points of the first video, wherein a first image, of the plurality of selectable images, comprises:
at least a portion of one or more images of the first video; and
artwork associated with the first video, wherein the artwork is based on the one or more images of the first video; and
a second image that corresponds to a second video, different from the first video; and
causing, after receiving an indication of a user selection of the second image, presentation of the second video.

12. The one or more non-transitory computer-readable media of claim 11, wherein the instructions, when executed, further cause:
generating the first image based on recognizing a character in the first video.

13. The one or more non-transitory computer-readable media of claim 11, wherein the first image comprises images from multiple frames of the first video.

14. The one or more non-transitory computer-readable media of claim 11, wherein the second image is generated based on one or more second images of the first video.

15. The one or more non-transitory computer-readable media of claim 11, wherein the instructions, when executed, further cause:
causing concurrent presentation of the first image and a textual description of a scene corresponding to the first image.

16. The one or more non-transitory computer-readable media of claim 11, wherein the instructions, when executed, further cause:
removing the first image from the timeline based on the one or more images of the first video no longer being presented.

17. The one or more non-transitory computer-readable media of claim 11, wherein the instructions, when executed, further cause:
removing the first image from the timeline based on progress of the first video.

18. The one or more non-transitory computer-readable media of claim 11, wherein the first image comprises images from a plurality of different content items.

19. The one or more non-transitory computer-readable media of claim 11, wherein the instructions, when executed, further cause:
receiving the first video via a Moving Picture Experts Group (MPEG) packetized elementary stream.

20. The one or more non-transitory computer-readable media of claim 11, wherein the instructions, when executed, further cause:
receiving the graphical descriptor data interleaved with blocks of the first video.

21. A system comprising:
a first computing device; and
a second computing device,
wherein the first computing device is configured to:
cause, based on graphical descriptor data associated with a first video, presentation of a timeline of selectable images, wherein the timeline comprises:
a plurality of selectable images that correspond to different time points of the first video, wherein a first image, of the plurality of selectable images, comprises:
at least a portion of one or more images of the first video; and
artwork associated with the first video, wherein the artwork is based on the one or more images of the first video;
a second image that corresponds to a second video, different from the first video; and
causing, after receiving an indication of a user selection of the second image, presentation of the second video, and
wherein the second computing device is configured to:
send the graphical descriptor data to the first computing device.

22. The system of claim 21, wherein the first computing device is further configured to:
generate the first image based on recognizing a character in the first video.

23. The system of claim 21, wherein the first image comprises images from multiple frames of the first video.

24. The system of claim 21, wherein the second image is generated based on one or more second images of the first video.

25. The system of claim 21, wherein the first computing device is further configured to:
cause concurrent presentation of the first image and a textual description of a scene corresponding to the first image.

26. The system of claim 21, the first computing device is further configured to:
remove the first image from the timeline based on the one or more images of the first video no longer being presented.

27. The system of claim 21, the first computing device is further configured to:
remove the first image from the timeline based on progress of the first video.

28. The system of claim 21, wherein the first image comprises images from a plurality of different content items.

29. The system of claim 21, wherein the first computing device is further configured to:
receive the first video via a Moving Picture Experts Group (MPEG) packetized elementary stream.

30. The system of claim 21, wherein the first computing device is further configured to:
receive the graphical descriptor data interleaved with blocks of the first video.

* * * * *